United States Patent
Wang

(10) Patent No.: US 9,522,333 B2
(45) Date of Patent: Dec. 20, 2016

(54) ELECTRONIC DEVICE, GAME CONTROL SYSTEM, AND METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Yin-Zhan Wang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 342 days.

(21) Appl. No.: 14/328,838

(22) Filed: Jul. 11, 2014

(65) Prior Publication Data
US 2015/0018100 A1    Jan. 15, 2015

(30) Foreign Application Priority Data
Jul. 12, 2013    (CN) .......................... 2013 1 02925638

(51) Int. Cl.
A63F 13/00    (2014.01)
A63F 13/79    (2014.01)
A63F 13/2145    (2014.01)
A63F 13/67    (2014.01)
G06K 9/00    (2006.01)

(52) U.S. Cl.
CPC ............ *A63F 13/79* (2014.09); *A63F 13/2145* (2014.09); *A63F 13/67* (2014.09); *G06K 9/00006* (2013.01)

(58) Field of Classification Search
CPC ..... A63F 13/79; A63F 13/214; G06K 9/00006
See application file for complete search history.

(56) References Cited

U.S. PATENT DOCUMENTS

| | | | |
|---|---|---|---|
| 2002/0111213 A1* | 8/2002 | McEntee | G07F 17/32 463/42 |
| 2006/0211493 A1* | 9/2006 | Walker | G06Q 30/02 463/29 |
| 2012/0322542 A1* | 12/2012 | Chudd | G07F 17/3206 463/25 |

* cited by examiner

*Primary Examiner* — Reginald Renwick
(74) *Attorney, Agent, or Firm* — Zhigang Ma

(57) ABSTRACT

A game control system and method compute a finger contact area of at least one finger of a user when the user touches a touch-input unit to play a game. An age range of the user corresponding to the obtained finger contact area is determined according to the obtained finger contact area and a relationship between finger contact areas and age ranges of the users. A difficulty setting of the game is adjusted according to the determined age range of the user and a relationship between age ranges and difficulty settings of the game. An electronic device is also provided.

15 Claims, 4 Drawing Sheets

First table 301

| Touch area (square centimeter) | Age range (years old) |
|---|---|
| 0.5-1 | 4-6 |
| 1-1.5 | 6-10 |
| 1.5-1.8 | 10-16 |
| ... | ... |

Second table 302

| Age range (years old) | Difficulty setting |
|---|---|
| 4-6 | Lowest difficulty setting level |
| 6-10 | Default difficulty setting level |
| 10-16 | Higher difficult setting level |
| ... | ... |

First table 301

| Touch area (square centimeter) | Age range (years old) |
|---|---|
| 0.5-1 | 4-6 |
| 1-1.5 | 6-10 |
| 1.5-1.8 | 10-16 |
| ... | ... |

Second table 302

| Age range (years old) | Difficulty setting |
|---|---|
| 4-6 | Lowest difficulty setting level |
| 6-10 | Default difficulty setting level |
| 10-16 | Higher difficult setting level |
| ... | ... |

FIG. 3

ELECTRONIC DEVICE, GAME CONTROL SYSTEM, AND METHOD

CROSS-REFERENCE TO RELATED APPLICATIONS

This application claims priority to Chinese Patent Application No.201310292563.8 filed on Jul. 12, 2013 in China Intellectual Property Office, the contents of which are incorporated by reference herein.

FIELD

The subject matter herein generally relates to game controlling methods.

BACKGROUND

When playing a game application running in an electronic device, users of different ages may prefer different difficulty levels of the game.

BRIEF DESCRIPTION OF THE DRAWINGS

Implementations of the present technology will now be described, by way of example only, with reference to the attached figures.

FIG. 3 is an embodiment of two relationship tables stored in the electronic device of FIG. 1.

DETAILED DESCRIPTION

Figure 1:
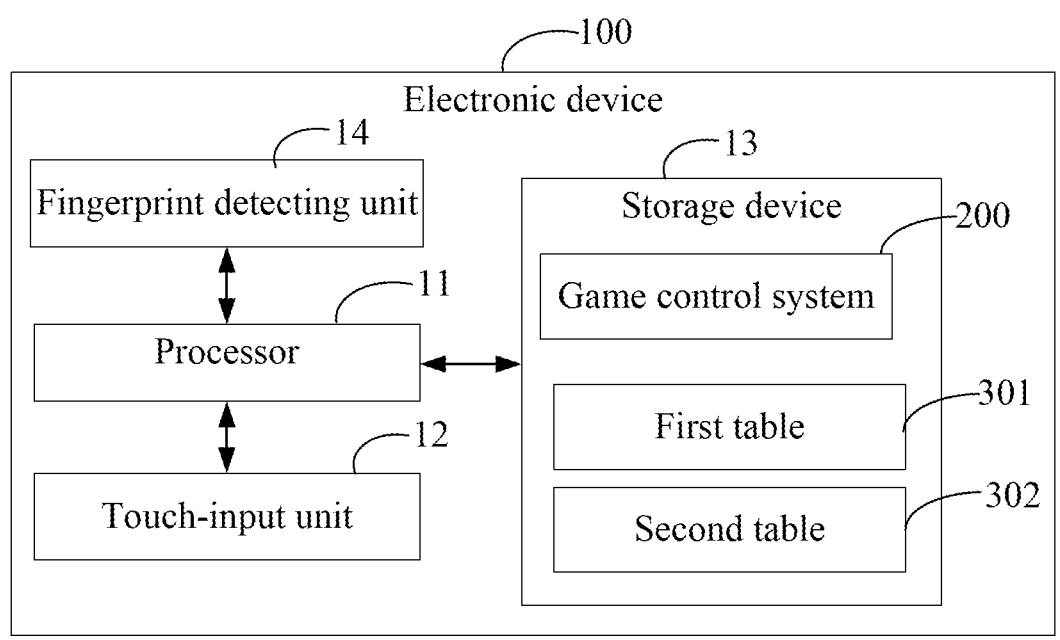
FIG. 1 is a block diagram of an embodiment of an electronic device running a game control system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Definitions that apply throughout disclosure will now be presented.

The term "module" refers to logic embodied in computing or firmware, or to a collection of software instruction, written in a programming language, such as Java, C, or assembly. One or more software instruction in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "coupled" is defined as connected, whether directly or indirectly through intervening components, and is not necessarily limited to physical connections. The connection can be such that the objects are permanently connected or releasably connected. The term "comprising" means "including, but not necessarily limited to", it specifically indicates open-ended inclusion or membership in a so-described combination, group, series and the like.

FIG. 1 illustrates an example embodiment of an electronic device 100 running a game control system 200. The electronic device 100 can install and run a variety of game applications. The electronic device 100 can be a touch-input device. The electronic device 100 includes a processor 11, a touch-input unit 12, a storage device 13, and a fingerprint detecting unit 14. In at least one embodiment, the electronic device 100 can be a mobile phone, a tablet computer, or the like. The processor 11 can be a central processing unit, a single chip, or a digital signal processor. The storage device 13 can be a smart media card, a secure digital card, or a flash card. The touch-input unit 12 can be a touch screen, which can generate touch input signals in response to a user's touch inputs. The fingerprint detecting unit 14 can detect fingerprints of a user when the user touches the touch-input unit 12.

The storage device 13 can store the variety of game applications (not shown). Each game application provides a corresponding game. When a game application is run by the electronic device 100, the game application is first run in a default difficulty setting of the game. A user can advance to a next level of the game only upon completing a current level of the game. In general, the next level of the game is more difficult to play than the current level of the game.

The storage device 13 can further store a first table 301 and a second table 302.

In at least one embodiment, as shown in FIG. 3, the first table 301 stores relationships between finger contact areas of users' fingers contacted the touch-input device and age ranges of the users, and the second table 302 stores relationships between the age ranges of the users and difficulty settings of the game. In at least one embodiment, the finger contact area of a user's finger is the area of a fingerprint of one finger of the user touched on the touch-input device 12. For example, as shown in the first table 301, a finger contact area of 0.5-1 square centimeter corresponds to an age range of 4-6 years old, a finger contact area of 1-1.5 square centimeters corresponds to an age range of 6-10 years old, and a finger contact area of 1.5-1.8 square centimeters corresponds to an age range of 10-16 years old. In the second table 302, the age range of 4-6 years old corresponds to a lowest difficulty setting, the age range of 6-10 years old corresponds to the default difficulty setting, and the age range of 10-16 years old corresponds to a higher difficulty setting.

The storage device 13 can further store playing histories of a number of users. In at least one embodiment, each playing history corresponds to the fingerprint of the corresponding user, and the playing history records a time period of the user playing the game and the levels of the game that the user has passed. For example, the playing history of a user "A" can record that the user "A" spends three minutes to pass the first level of the game at nine o'clock on Monday morning, and the user "A" further spends two minutes to pass the second level of the game at ten o'clock on Monday morning.

Figure 2:
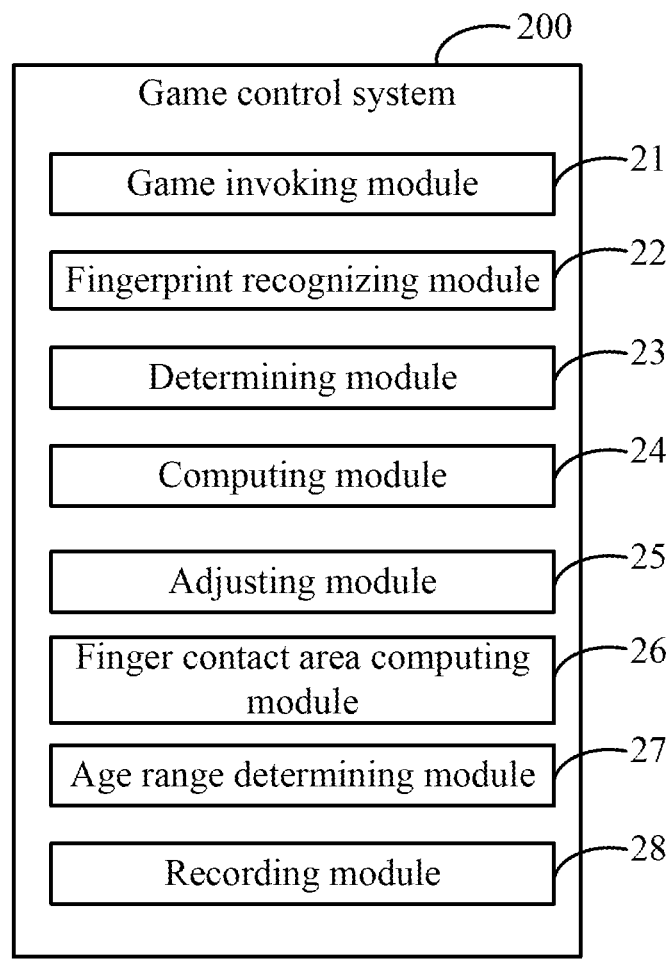
FIG. 2 is a block diagram of an embodiment of the game control system of FIG. 1.

FIG. 2 illustrates an example embodiment of the game control system 200. The game control system 200 can include a number of modules, which are a collection of software instructions executed by the processor 11.

In at least one embodiment, the game control system 200 can include a game invoking module 21, a fingerprint recognizing module 22, a determining module 23, a computing module 24, an adjusting module 25, a finger contact area computing module 26, an age range determining module 27, and a recording module 28.

The game invoking module 21 invokes a game application installed in the electronic device 100 in response to a user's input, and displays a corresponding game interface on the touch-input unit 12.

The fingerprint recognizing module 22 obtains fingerprints of the user via the fingerprint detecting unit 14 when the user touches the touch-input unit 12 to play the game.

The determining module 23 determines whether the fingerprints obtained by the fingerprint recognizing module 22 correspond to a playing history recorded in the storage device 13.

If the determining module 23 determines that the obtained fingerprints do not correspond to any playing history recorded in the storage device 13, the finger contact area computing module 26 computes a finger contact area of at least one of the fingerprints. In this embodiment, the contact area computing module 26 computes the finger contact area of at least one of the obtained fingerprints by scanning a number of rows and columns of the touch-input unit 12 covered by the at least one fingerprint of the user.

The age range determining module 27 obtains the finger contact area computed by the finger contact area computing module 26, and determines an age range corresponding to the computed finger contact area according to the obtained finger contact area and the first table 301.

The adjusting module 25 adjusts the difficulty setting of the game according to the age range determined by the age range determining module 27 and the relationship stored in the second table 302. For example, if the age range determining module 27 determines that the user is within the age range of 4-6 years old, the adjusting module 25 adjusts the difficulty setting of the game to the lowest difficulty setting.

If the determining module 23 determines that the obtained fingerprint corresponds to a playing history recorded in the storage device 13, the computing module 24 computes how many times the user has passed a preset game level. In this embodiment, the preset game level is a highest game level that the user has passed. In an alternative embodiment, the computing module 24 can compute how many times the user has passed every game level.

The determining module 23 determines whether the user has passed the preset game level a preset number of times.

If the determining module 23 determines that the user has passed the preset game level the preset number of times, the adjusting module 25 adjusts the difficulty setting of the preset game level to a higher level. For example, if the preset number of times is four, when the playing history records that the user has passed the first game level four times, the adjusting module 25 adjusts the difficulty setting of the first game level to a next difficulty setting.

If the determining module 23 determines that the user has not passed the preset game level the preset number of times, the finger contact area computing module 26 computes a finger contact area of at least one of the obtained fingerprints of the user. The age range determining module 27 obtains the finger contact area computed by the finger contact area computing module 26, and determines the age range corresponding to the obtained finger contact area according to the first table 301. The adjusting module 25 adjusts the difficulty setting of the game according to the second table 302.

The recording module 28 records the playing history of the user, and stores the playing history in the storage device 13.

Figure 4:
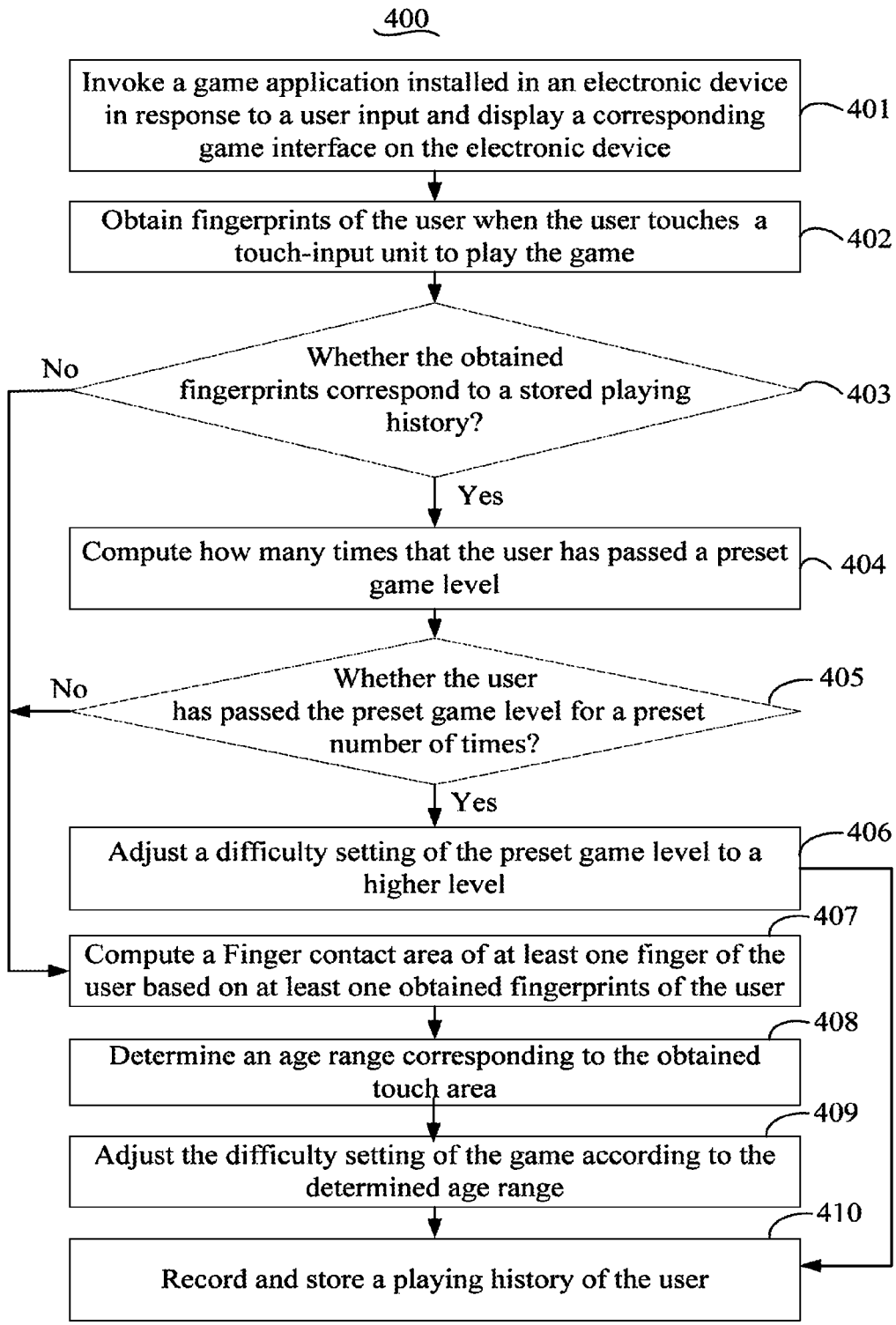
FIG. 4 is a flowchart of an embodiment of a game control method.

FIG. 4 illustrates a flowchart in accordance with an example embodiment. The example game control method 400 is provided by way of example, as there are a variety of ways to carry out the method. The method described below can be carried out using the configurations illustrated in FIG. 1 and FIG. 2, for example, and various elements of these figures are referenced in explaining the example method. Each block shown in FIG. 2 represents one or more processes, methods, or subroutines carried out in the example method. Additionally, the illustrated order of blocks is by example only and the order of the blocks can be changed. The example game control method can begin at block 401.

At block 401, a game invoking module invokes a game application installed in an electronic device in response to a user's input, and displays a corresponding game interface on a touch-input unit of the electronic device.

At block 402, a fingerprint recognizing module obtains fingerprints of the user via a fingerprint detecting unit when the user touches the touch-input unit to play the game.

At block 403, a determining module determines whether the fingerprints obtained by the fingerprint recognizing module correspond to a playing history stored in a storage device. If yes, the procedure proceeds to block 404; if no, the procedure proceeds to block 407.

At block 404, a computing module computes how many times the user has passed a preset game level. In this embodiment, the preset game level is a highest level that the user has passed. In an alternative embodiment, the computing module can compute how many times the user has passed every game level.

At block 405, a determining module determines whether the user has passed the preset game level a preset number of times. If yes, the procedure proceeds to block 406; if no, the procedure proceeds to block 407.

At block 406, an adjusting module adjusts a difficulty setting of the preset game level to a higher level.

At block 407, a finger contact area computing module computes a finger contact area of at least one of the obtained fingerprints.

At block 408, an age range determining module obtains the finger contact area computed by the finger contact area computing module, and determines an age range corresponding to the obtained finger contact area according to the obtained finger contact area and relationships between finger contact areas and age ranges stored in a first table.

At block 409, the adjusting module adjusts the difficulty setting of the game according to the age range determined by the age range determining module and relationships between the age ranges of the users and the difficulty settings stored in a second table.

At block 410, a recording module records the playing history of the user, and stores the playing history in the storage device.

The embodiments shown and described above are only examples. Many details are often found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An electronic device comprising:
    a touch-input unit configured to generate touch input signals in response to a detection of a touch;
    a fingerprint detection unit coupled to the touch-input unit and configured to detect fingerprints of a user on the touch-input unit;
    a storage device configured to store:
        a variety of game applications,
        a first table recording relationships between finger contact areas of user's fingers and age ranges of the users, and
        a second table recording relationships between age ranges of the users and difficulty settings of one of the variety of games;
    a processor coupled to the storage device and the fingerprint detecting unit;
    a finger contact area computing module, stored in the storage device, comprising instructions to cause the processor to obtain the detected fingerprints of the user and compute a finger contact area of at least one finger of the user contacted the touch-input unit based on at least one fingerprint of the user detected by the fingerprint detecting unit;
    an age range determining module, stored in the storage device, comprising instructions to cause the processor to obtain the finger contact area computed by the finger contact area computing module and determine an age rang of the user corresponding to the obtained finger contact area based on the obtained finger contact area and data in the first table; and
    an adjusting module, stored in the storage device, comprising instructions to cause the processor to adjusts a difficulty setting of the game according to the age range determined by the age range determining module and the second table.

2. The electronic device of claim 1, wherein the storage device further can store playing histories of a number of users, the electronic device further comprises:
    a fingerprint recognizing module, stored in the storage device, comprising instructions to cause the processor to obtain the fingerprints of the user detected by the fingerprint detecting unit;
    a determining module, stored in the storage device, comprising instructions to cause the processor to determine whether the fingerprints obtained by the fingerprint recognizing module correspond to a playing history recorded in the storage device; and
    a computing module stored in the storage device, if the determining module determines that the fingerprints obtained by the fingerprint recognizing module correspond to the playing history recorded in the storage device, the computing module computes how many times the user has passed a preset game level;
    wherein the determining module further comprises instructions to cause the processor to determine whether the user has passed the preset game level for a preset number of times, and the adjusting module adjusts difficulty setting of the preset game level to a higher level if the determining module determines that the user has passed the preset game level the preset number of times.

3. The electronic device of claim 2, wherein the preset game level is a highest game level that the user has passed.

4. The electronic device of claim 2, wherein the preset game level is every game level that the user has passed.

5. The electronic device of claim 2, further comprising a recording module, stored in the storage device, comprising instructions to cause the processor to record the playing history of the user, and stores the playing history in the storage device.

6. A game control system applied in an electronic device, the electronic device installing a variety of game applications for providing corresponding games, the electronic device comprising a touch-input unit, a fingerprint detecting unit, a storage device, and a processor, the game control system comprising:
    a finger contact area computing module, stored in the storage device, comprising instructions to cause the processor to compute a finger contact area of at least one finger of the user based on at least one fingerprint of the user detected by the fingerprint detecting unit;
    an age range determining module, stored in the storage device, comprising instructions to cause the processor to obtain the finger contact area computed by the finger contact area computing module and determine an age rang of the user corresponding to the obtained finger contact area, according to the obtained finger contact area and data in a first table, which recording relationships between finger contact areas of users and age ranges of users; and
    an adjusting module, stored in the storage device, comprising instructions to cause the processor to adjusts a difficulty setting of the game according to the age range determined by the age range determining module and data in a second table, which recording relationships between age ranges of users and difficulty settings of one of the variety of games.

7. The game control system of claim 6, wherein the storage device of the electronic device further can store playing histories of a number of users, the game control system further comprises:
    a fingerprint recognizing module, stored in the storage device, comprising instructions to cause the processor to obtain the fingerprints of the user detected by the fingerprint detecting unit;
    a determining module, stored in the storage device, comprising instructions to cause the processor to determine whether the fingerprints obtained by the fingerprint recognizing module correspond to a playing history recorded in the storage device; and
    a computing module stored in the storage device, if the determining module determines that the fingerprints obtained by the fingerprint recognizing module corresponds to the playing history recorded in the storage device, the computing module computes how many times the user has passed a preset game level;
    wherein the determining module further comprises instructions to cause the processor to determine whether the user has passed the preset game level for a preset number of times, and the adjusting module adjusts difficulty setting of the preset game level to a higher level if the determining module determines that the user has passed the preset game level the preset number of times.

8. The game control system of claim 7, wherein the preset game level is a highest game level that the user has passed.

9. The game control system of claim 7, wherein the preset game level is every game level that the user has passed.

10. The game control system of claim 7, further comprising a recording module, stored in the storage device, comprising instructions to cause the processor to record the playing history of the user, and stores the playing history in the storage device.

11. A game control method applied in an electronic device, the electronic device installing a variety of game applications for providing corresponding games, the electronic device comprising a touch-input unit, a fingerprint detecting unit, a storage device and a processor, the method comprising:

computing a finger contact area of at least one finger of a user based on at least one fingerprint of the user by the fingerprint detecting unit;

obtaining computed the finger contact area of the at least one finger of the user and determining an age rang of the user corresponding to the obtained finger contact area according to the obtained finger contact area and a first table which records relationships between finger contact areas of users and age ranges of users; and adjusting a difficulty setting of the game according to the determined age range and a second table recording relationships between age ranges of users and difficulty settings of one of the variety of games.

12. The game control method of claim 11, wherein the storage device of the electronic device further can record playing histories of a number of users, the game control method further comprises:

obtaining the detected fingerprints of the user by the processor;

determining whether the obtained fingerprints correspond to a playing history recorded in the storage device;

computing how many times the user has passed a preset game level by the processor if the obtained fingerprints correspond to the playing history stored in the storage device;

determining whether the user has passed the preset game level for a preset number of times by the processor; and adjusting a difficulty setting of the preset game level to a higher level by the processor if determining that the user has passed the preset game level the preset number of times.

13. The game control method of claim 12, wherein the preset game level is a highest game level that the user has passed.

14. The game control method of claim 12, wherein the preset game level is every game level that the user has passed.

15. The game control method of claim 12, further comprising:

recording playing history of the user and storing the playing history to the storage device.

* * * * *